(12) United States Patent
Mosher

(10) Patent No.: US 6,199,779 B1
(45) Date of Patent: Mar. 13, 2001

(54) METHOD TO RECOVER METAL FROM A METAL-CONTAINING DROSS MATERIAL

(75) Inventor: John Mosher, Golden, CO (US)

(73) Assignee: Alcoa Inc., Alcoa Center, PA (US)

( * ) Notice: Subject to any disclaimer, the term of this patent is extended or adjusted under 35 U.S.C. 154(b) by 0 days.

(21) Appl. No.: 09/345,332

(22) Filed: Jun. 30, 1999

(51) Int. Cl.[7] .................................................. B02C 19/12
(52) U.S. Cl. .......................................... 241/19; 241/24.13
(58) Field of Search ................................... 241/19, 24.13, 241/24.14, 24.15, 80, 97

(56) References Cited

U.S. PATENT DOCUMENTS

| | | |
|---|---|---|
| 3,660,076 | 5/1972 | Williams . |
| 3,770,424 * | 11/1973 | Floyd et al. ..................... 241/24.13 |
| 4,033,760 | 7/1977 | Lance et al. . |
| 4,106,627 | 8/1978 | Watanabe et al. . |
| 4,137,156 | 1/1979 | Morey et al. . |
| 4,386,956 | 6/1983 | Roth et al. . |
| 4,418,892 | 12/1983 | Howell . |
| 4,752,328 | 6/1988 | Peterson . |
| 5,060,871 | 10/1991 | Brassinga et al. . |
| 5,108,587 | 4/1992 | Walker . |
| 5,192,359 | 3/1993 | Bourcier et al. . |

OTHER PUBLICATIONS

Heath, R.A., "The Aerofall Mill Applied to Industrial Materials", Aerofall Mills (U.S.), Inc.

* cited by examiner

Primary Examiner—Mark Rosenbaum
(74) Attorney, Agent, or Firm—Sheridan Ross P.C.; Edward L. Lavine

(57) ABSTRACT

A process is provided for recovering metal from metal-containing waste or dross. The process generally includes the steps of comminuting the dross, and then classifying the comminuted dross into a metal enriched large size fraction and salt enriched small size fraction. The process further involves the classification of the large size fraction into a metal-containing product stream and a recycle stream. According to the method, the portion characterized as recycle may then be conducted to the comminution device for further comminution. The salt enriched fraction may be classified on the basis of size, and that portion having a larger size may be conducted to the comminution device for further processing. Additional steps of size classification may also be beneficially utilized according to the process. The disclosed process allows the efficient recovery of metal from metal-containing dross while significantly reducing the amount of waste salts that must be disposed of in landfills.

22 Claims, 2 Drawing Sheets

METHOD TO RECOVER METAL FROM A METAL-CONTAINING DROSS MATERIAL

FIELD OF THE INVENTION

The present invention relates generally to the recovery of metal or metal concentrate from a metal-containing thermal processing by-product or dross.

BACKGROUND OF THE INVENTION

Used aluminum beverage cans and other products made from aluminum are often recycled to recover the aluminum they contain for use in other products. Typically, aluminum scrap is recycled in reverberatory furnaces. Flux is used in these furnaces to promote the melting of the aluminum. This flux, together with oxides, dirt, and other materials, forms a viscous mass of dross, which floats on top of the molten aluminum. This dross impedes the assimilation of additional metal to the molten aluminum, and therefore must be skimmed off of the liquid aluminum before additional solid material may be melted in the furnace. The dross solidifies after cooling into a mass that typically contains about 65% aluminum metal.

Methods to recover aluminum from furnace dross include grinding and screening the metallic dross. Grinding achieves some separation of the metal from the portions having a high salt and oxide content because the waste products are more friable than the portions having a relatively high metal content. Therefore, after grinding, the portions of the dross constituting waste are reduced to fine particles, while those portions having a higher aluminum content tend to resist reduction by the mill. Accordingly, a screening operation can achieve some separation between metal enriched and waste products. However, previous methods for recovering aluminum values from dross that rely on grinding processes either do not produce a high enough grade product because efficient separation of aluminum from waste is not effected or have poor recoveries if sufficient size reduction is conducted because aluminum fines are produced which are lost with waste product.

Another method for directly recovering metal from metal-containing dross, used alone or in combination with grinding, is the melting of metal-containing dross in a rotary furnace. According to such a method, the dross is fed into a rotary furnace, together with a large amount of salt flux. The flux is necessary to enable the release of the aluminum metal from the other constituents. This salt flux reports to salt cake upon cooling, which must be landfilled. Therefore, such methods have associated drawbacks, such as environmental concerns.

An additional method for recovering metal from dross, disclosed in U.S. Pat. No. 5,192,359, involves the separation and classification of dross particles based on the electrical conductivity of each particle. According to this method, size separation is conducted and large particles are processed in a furnace and small particles are subjected to a linear electromagnetic force field provided by an inclined linear induction motor. Particles that are dropped generally along the length of the inclined linear motor are levitated if they are conductive. A separator then allows the conductive, metal-containing particles to be collected separately from the waste particles.

Accordingly, there is a need for an economical process that is capable of recovering high grade metal from metal-containing dross, and which is capable of processing large amounts of dross. Furthermore, there is a need for a process that reduces the amount of waste material remaining after the metal has been removed from the metal-containing dross.

SUMMARY OF THE INVENTION

The present invention includes a method to recover metal from a metal-containing dross material. In preferred embodiments, the metal in the metal-containing dross can include aluminum, magnesium, nickel, tin, copper, brass, zinc, gold, silver, and platinum. In a further preferred embodiment, the metal is aluminum.

The method includes comminuting the dross in a comminution device. A salt enriched small size fraction is removed from the comminuted dross on a size separation basis. A metal-enriched, large size fraction is removed from the comminuted dross on a size separation basis. Metal from the metal enriched fraction of material is recovered using a method selected from the group consisting of eddy current separation, magnetic separation, electromagnetic separation, density separation, electrostatic separation, electrodynamic separation, size separation, shape separation and color separation to form a metal product and a recycle product. The metal product from this separation is preferably of high grade. Thus, the separation is made so that the recycle product contains particles which are substantially mixed quality. Therefore, the recycle product contains particles having significant amounts of metal, in addition to particles which are of substantially only waste material. Typically, the recycle product comprises between about 30% and about 75% by weight metal. The method further includes conducting the recycle product to the comminution device for further processing. In this manner, the mixed quality particles can be further comminuted to liberate the metal portions of the particles for separation as a high quality metal product.

In a preferred embodiment, the comminution device is a mill, and in a further preferred embodiment, the comminution device is a semi-autogenous mill. According to one embodiment, the step of removing a salt enriched small size fraction from the comminuted dross material comprises removing that fraction using an air sweep.

The metal in the metal-containing dross material can be of any type. According to one embodiment of the invention, the metal is selected from the group consisting of aluminum, magnesium, nickel, tin, copper, brass, zinc, gold, silver, and platinum. Further, the metal-containing dross material may be an aluminum dross, a copper slag, or a brass dross. According to one embodiment, the metal-containing dross material comprises between about 50% and about 65% metal.

In a further preferred embodiment, the described method is conducted continuously. In an additional preferred embodiment, the step of recovering metal from the metal enriched large size fraction comprises eddy current separation. In yet another preferred embodiment, the metal enriched fraction comprises greater than about 65% by weight aluminum. In a more preferred embodiment, the recovered metal comprises greater than about 70% by weight aluminum.

In another preferred embodiment, the salt enriched small size fraction is processed by a vertical vortex classifier. Larger and/or heavier particles from a vertical vortex classifier can be returned to the comminution device for further processing. In yet another preferred embodiment, the salt enriched small size fraction is additionally processed by cyclone classifiers. The heavier fraction from the cyclone classifiers can be screened to produce a metal concentrate and a waste product.

According to an additional embodiment of the present invention, the method for recovering metal from a metal-containing dross material comprises comminuting the dross in a semi-autogenous mill having a peripheral port. A salt enriched fraction is continuously removed from the comminuted dross material using an air sweep. A metal enriched fraction comprising greater than about 65% by weight metal is continuously removed from the comminuted dross through the peripheral port of the semi-autogenous mill. An enriched product, comprising greater than about 70% by weight metal, and a recycle product comprising between about 30% by weight and about 75% by weight metal, are formed by conducting eddy current separation on the metal enriched fraction. The recycle product is then conducted to the comminution device.

According to a further embodiment of the present invention, a method for recovering aluminum from an aluminum-containing dross is provided. According to this method, a continuous flow of aluminum-containing dross is provided to a semi-autogenous mill having at least one peripheral port. The particle size of this dross is less than about 150 mm and comprises between about 50% and about 65% by weight aluminum. The size of the aluminum-containing dross is reduced in the semi-autogenous mill. A flow of air is directed through the mill to remove a salt enriched fraction having an 80% passing particle size of about 2000 $\mu$m. An aluminum enriched fraction, having an 80% retained particle size of greater than about 1.0 mm and comprising greater than about 65% by weight aluminum, is removed from the semi-autogenous mill through the peripheral port. Eddy current separation is then conducted on the aluminum enriched fraction to form an enriched product comprising greater than about 70% by weight aluminum and a recycle product. The recycle product of the aluminum enriched fraction is then returned to the semi-autogenous mill for further comminution.

DETAILED DESCRIPTION

The present invention concerns a method to recover metal from a metal-containing dross material. The method of the present invention provides a high grade metal product, using a continuous process. This process employs a variety of separation methods to improve the quality of the product. Generally, the separation steps include separation on the basis of differences in density and separation by a secondary separation process as described fully below.

The present invention is effective at removing metal from a metal-containing dross material. As used herein, the term "dross" generally refers to any waste material taken from molten metal during processing. Thus, the process of the present invention is suitable for any metal-containing dross. For example, the dross can be aluminum dross (black or white), copper slag or brass dross. Preferably, the dross processed by the present invention is aluminum dross. As used herein, the term "dross material" refers to not only dross, but also to by-products of processing dross, such as a salt cake produced by processing dross in a rotary furnace. Moreover, the metal removed from the dross material can be any metal in the dross material and is not limited to the metal being processed to produce the dross. Thus, the recovered metal can be aluminum, magnesium, nickel, tin, copper, brass, zinc, gold, silver, and platinum. Preferably, the recovered metal is aluminum. The dross material typically has between about 5% by weight and about 85% by weight metal, more typically, between about 40% and about 70% metal, and most typically, between about 50% and about 65% metal.

It should be appreciated that the present invention can be conducted to recover metals from other metal containing materials as well. For example, the present process can be used to recover metal from recycled refractory bricks which contain significant amounts of various metals, such as copper or platinum.

The dross material at the outset of the process can be processed so that it has an appropriate size for handling in the process of the present invention. Typically, the dross has a particle size of less than about 150 mm.

Figure 1:
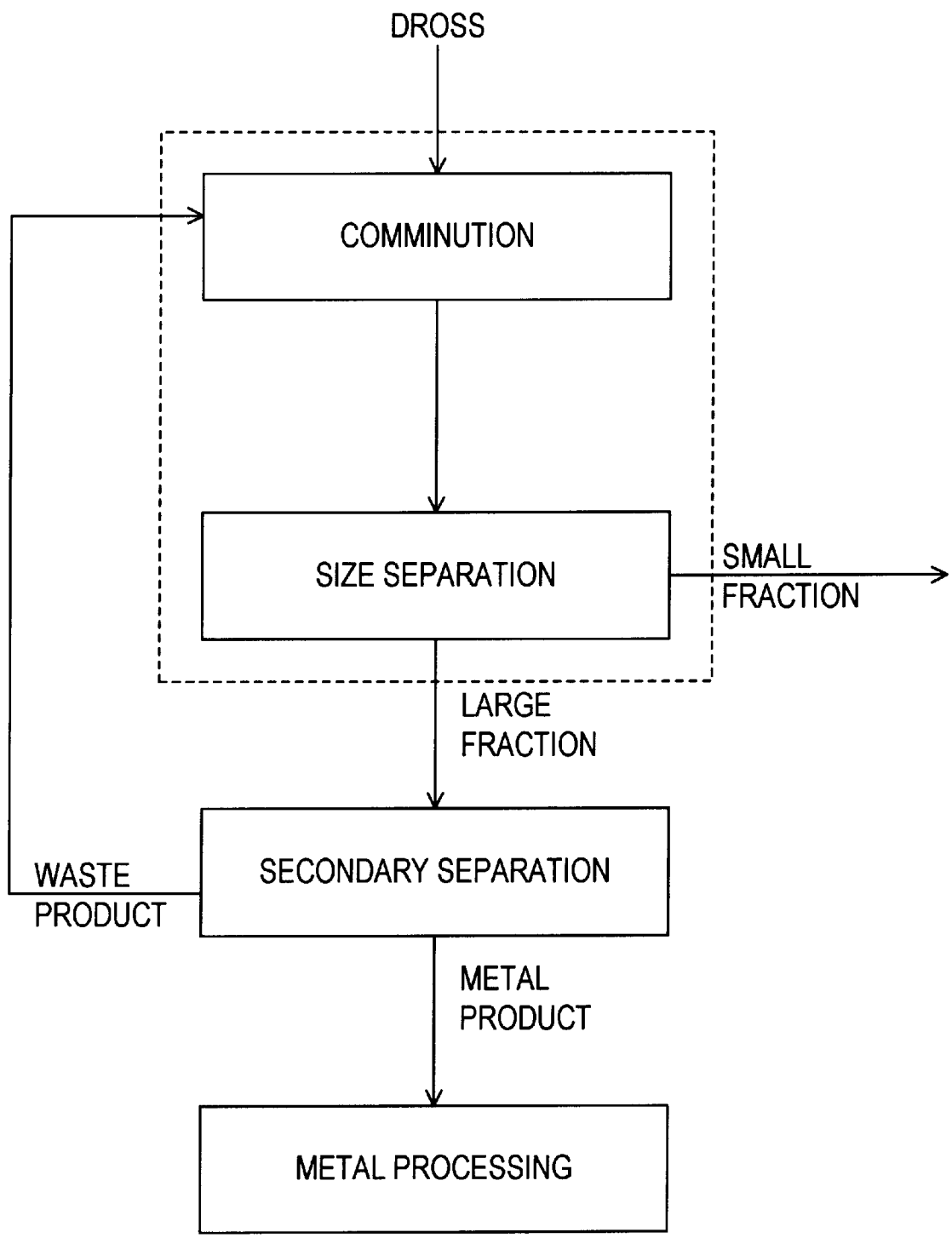
FIG. 1 is a flow chart of the process of the present invention.

With reference to FIG. 1, the basic steps of the process of the present invention are illustrated. Dross material is introduced to a comminution device in which the dross material is reduced in size to liberate metal particles from waste material. The comminuted dross material is then divided into a salt enriched small size fraction and a metal enriched large size fraction on a size separation basis. The metal enriched large size fraction is conducted to a secondary separation device. The metal enriched fraction is then further separated into a metal product and a recycle product by a secondary separation method. The metal product from this separation is preferably of high grade and can be conducted to further processing. Thus, the secondary separation is made so that the recycle product contains particles which are of substantially mixed quality. Therefore, the recycle product contains particles having significant amounts of metal, in addition to particles which are substantially only waste material. The method further includes conducting the recycle product to the comminution device for further processing. In this manner, the mixed quality particles can be further comminuted to liberate the metal portions of the particles for separation as a high quality metal product.

Comminution of the dross material serves to break the dross material into particles having a relatively high metal content and particles having a relatively low metal content. This is because particles consisting primarily of metal are less friable. Conversely, particles having a lower metal content, and thus a higher relative content of oxides and impurities, are more friable. Therefore, the brittle lower metal content particles are more prone to being reduced in size by the comminution process than are the relatively metal enriched portions. Thus, comminution reduces the dross material to a portion having a relatively large particle size characterized by having a relatively high metal content, and a small size fraction characterized by having a relatively lower metal content.

According to the present invention, the comminution of the dross may be achieved in a mill. As discussed below, in addition to comminution, a semi-autogenous mill can function to make a size separation. Thus, in FIG. 1, the comminution step and the size separation steps are enclosed by a dashed line to indicate that these steps can be accomplished by a single apparatus. Preferably, the mill is a semi-autogenous mill. A semi-autogenous mill breaks the feed material into smaller particles through impact and abrasion. In such a mill, this impact and abrasion is the result of contact with a charge of steel balls resident in the mill, and of the interaction of particles of the material being milled. Semi-autogenous mills are particularly effective in the recovery of metal from dross material because the particle to particle abrasion breakage of the dross particles promotes the beneficiation of the larger, metal enriched size fraction. Specifically, this abrasion promotes the removal of oxides and salts that were not broken off of the metal enriched fraction through impact.

The semi-autogenous mill typically consists of a rotating, cylindrical steel shell. The interior of the shell features protrusions or lifters to carry the material to be ground, such as dross material, and the mill charge, such as steel balls, towards the highest point of the mill as the shell rotates about a center axis. The dross material and the mill charge then drops across the center portion of the mill and impacts the bottom. The impact of the dross material against the bottom of the mill, as well as the impact of the ball charge and of other dross particles on particles of dross material resting on the bottom of the mill, causes breakage. As described above, the portions of dross material having a relatively high metal content resist being broken into smaller pieces, while portions having a relatively low metal content are more easily reduced in size. In addition, the coarse dross particles abrade each other, promoting the removal of salts and oxides from particles having a high metal content. This abrasion thus has the effect of cleaning the larger, metal enriched particles of oxides, salts, and other waste material.

The metal enriched particles of comminuted dross material are separated from the waste particles on a size separation basis. The size separation may be achieved, in part, using an air sweep to remove smaller particles from a semi-autogenous mill. Generally, an air sweep consists of a draft fan that directs a flow of air across the mill to entrain smaller particles. This flow tends to remove the smaller size waste material, while leaving the larger size metal enriched fraction in the mill. Thus, the dross material is categorized and separated into a metal enriched fraction and a salt enriched fraction.

Where a rotary mill as described above is used to comminute the dross material, the air sweep may consist of a fan that directs a flow of air through the center of the mill. The air flow then removes the smaller size material from the mill as the comminuted material falls across the center of the mill. Accordingly, the air sweep results in a metal enriched fraction of dross remaining in the mill, and a salt enriched fraction being removed from the mill. While in a size separation with a cross flow of air, separation is based primarily on size differences, differences in density and particle shape will have some effect. However, the particular equipment and operation thereof are selected to primarily achieve a size separation.

The fine, salt enriched particles that are removed from the mill using an air sweep or other size separation mechanism may be further processed to increase the metal recovery of the system. Such further processing may include classification on the basis of particle density and size, such as by a vertical vortex classifier. Such classification is beneficial, because particles having a higher density and larger size will typically have a higher metal content than those particles that are less dense and smaller. The portion classified as larger and having a higher density may be beneficially returned to the mill for further processing. Further processing of the higher density and larger fine particles is effective at liberating a further amount of metal from salt enriched particles from the mill. More particularly, in the case of aluminum dross, the portion of the salt enriched fraction to be returned to the mill for further processing has an aluminum content of less than about 55% by weight, more preferably, less than about 50%, and most preferably, less than about 45%. In addition, the salt enriched fraction typically has an 80% passing particle size of about 2000 $\mu$m, more preferably, about 1000 $\mu$m, and even more preferably, about 750 $\mu$m. By "80% passing particle size," it is meant that 80% by weight of the particles in the fraction would pass through a screen of the referenced size.

The fine particles classified by a first density and size separation, such as by a vertical vortex classifier, as having a low density and small size may be subjected to further processing by a density separator. This material so classified is characterized as having a metal content lower than the starting dross material. For example, the particles may be processed by a size separation such as by one or more cyclone classifiers, which separate the lighter (i.e. smaller and/or less dense) particles from heavier (i.e. larger and/or denser) particles. The heavier fraction may be screened to produce a metal concentrate and a waste product. The lower density particles may be removed as waste.

The metal enriched, large size fraction from the first size separation is removed from the mill through a peripheral port or ports. The removal of the metal enriched portion through peripheral ports eliminates the need to periodically stop the mill to empty it. Accordingly, the present invention allows the milling process to be conducted continuously, thereby enhancing efficiency. It will be appreciated that to conduct the process continuously, without buildup of material in the mill, the total inflow from the feed and any recycle streams must be balanced against the total outflow through the air sweep and the peripheral ports. More particularly, the outflow through the air sweep is a function of the airflow and the size of the airflow outlet. The outflow through the peripheral ports is a function of the aperture of the ports. Both outflows are also affected by the rate of size reduction which is a function of the volume of steel charge and the rate of rotation of the steel shell.

The metal enriched fraction being removed from the mill has a metal content greater than the starting dross material. More particularly, in the case of aluminum dross and other metal-containing dross materials, the metal enriched fraction has a metal content of greater than about 65% by weight, more preferably, greater than about 75%, and most preferably, greater than about 80%. In addition, the metal enriched fraction typically has an 80% retained particle size of about 1.0 mm, more preferably, about 1.5 mm, and even more preferably about 1.75 mm. By "80% retained particle size," it is meant that 80% by weight of the particles in the fraction would be retained by a screen of the referenced size.

Following removal from the mill via the peripheral ports, the metal enriched fraction is separated into a recovered metal fraction and a recycle fraction. This secondary separation is made on the basis of one or more of a variety of properties which are different for the metal and for recycle material. Appropriate secondary separation methods for discriminating metal particles from recycle particles include eddy current separation, magnetic separation, electromagnetic separation, density separation, electrostatic separation, electrodynamic separation, size separation, shape separation and color separation. According to a preferred embodiment of the present invention, eddy current separation is used. Eddy current separation is effective in segregating the metal particles from recycle particles because it distinguishes those particles having a relatively high conductivity from those particles that are not electrically conductive. Generally, eddy current separation consists of subjecting the particles to a time varying magnetic field. This time varying magnetic field induces electrical currents (eddy currents) in particles that are conductive. These currents then interact with the magnetic field that produces them, which tends to accelerate the conductive particles. This acceleration can be used to separate the conductive (i.e. high metal content) particles from the recycle (i.e., salt enriched) particles.

The other separation methods referenced above (i.e., magnetic separation, electromagnetic separation, density separation, electrostatic separation, electrodynamic separation, size separation, shape separation and color separation) are well-known in the art. Methods for practicing such methods in the context of the present invention will be apparent to those skilled in the art.

The particles classified as metal by the secondary separation preferably have a metal content which is higher than the metal enriched fraction feeding to the secondary separation from the size separation step. For instance, the recovered fraction from the secondary separation has a metal content of about 70% by weight or higher. More preferably, the metal content of the metal product is about 80% or higher. Most preferably, the metal has an aluminum or metal content of about 85% or higher. The particles classified as metal may then be conducted to a furnace for further processing.

Because the metal product recovered using the above-described process is relatively pure, the need to introduce salt fluxes to the furnace receiving that product is reduced. Thus, the amount of salt cake produced is lessened, reducing the amount of material that is waste and that must be landfilled.

The particles classified as recycle by the secondary separation step are, according to the present invention, conducted to the feed of the mill for further processing. This stream of recycle product is characterized as having a significant amount of recoverable metal, but also as having enough waste material that the quality or purity of the metal product stream would be degraded to an unacceptable level if the recycle product stream were to be included. Accordingly, the recycle product stream is characterized as having particles with between about 30% and about 75% by weight metal, more preferably, between about 40% and about 70% by weight metal, and most preferably, between about 50% and about 65% by weight metal. Examples of such particles include those where metal is joined to a large particle of waste, or where an oxide shell surrounds a metallic core. By conducting the recycle product stream back to the mill for further processing, such particles of mixed quality can be ground more finely to separate a more pure metal fraction from a less pure waste fraction. In this manner, as a particle of mixed quality is conducted for a second or recycle pass through the mill, the metal portion of the particle can be separated from waste material, exit through a peripheral port, and be properly classified as a high purity metal particle in the secondary separation. The further processing of the recycle product stream removed from the secondary separator increases the efficiency of the process and allows for the recovery of a high quality metal product.

Figure 2:
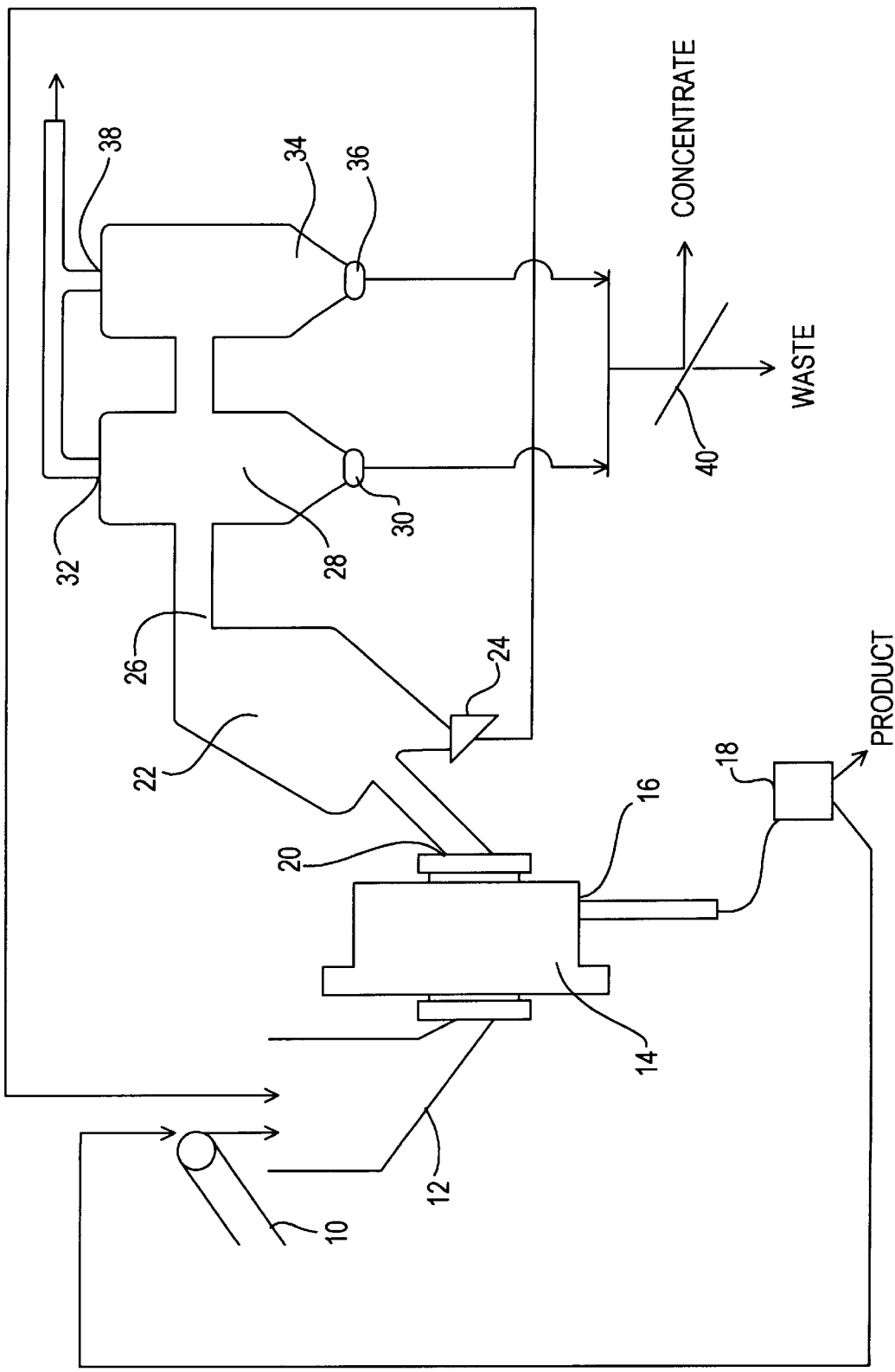
FIG. 2 is an illustration of a preferred embodiment of equipment used in the process of the present invention.

With reference to FIG. 2, a preferred embodiment of the present invention is illustrated. Aluminum dross feed material is conducted along a conveyor 10 and into a feed chute 12. The feed chute 12 feeds the aluminum dross material into a semi-autogenous mill 14. The semi-autogenous mill 14 rotates to cause milling of the dross material, in part, by a steel charge (not shown). As the dross material is ground in the mill 14, large particles exit through one or more peripheral ports 16. The large particle size material exiting the peripheral port 16 is conducted to an eddy current separator 18. A separation is conducted with the eddy current separator 18 to produce an aluminum-enriched conductive fraction as a product. The aluminum product can be further processed by conventional aluminum processing methods. The non-conductive or recycle fraction from the eddy current separation in the eddy current separator 18 includes particles of waste material and mixed particles which include both waste material and aluminum values. The entire recycle stream is conducted back to the feed chute 12 for further processing through the semi-autogenous mill 14 for recovery of aluminum values in this stream.

As material is processed in the semi-autogenous mill 14, an air sweep is conducted through the mill 14 and out through an air sweep exit port 20. Smaller particles are entrained in the air sweep and exit through the air sweep exit port 20. The flow through the air sweep exit port 20 is conducted to a vertical classifier 22. Relatively large and dense particles drop from the air flow and exit the vertical classifier bottom port 24. Such particles may include aluminum values. This stream is conducted from the vertical classifier bottom port 24 back to the feed chute 12 and into the semi-autogenous mill 14 for further processing. The vertical classifier 22 also includes a vertical classifier top port for smaller and less dense particles to pass from the vertical classifier 22. The flow of particles exiting the vertical classifier top port is then conducted to a first air cyclone 28. A separation is conducted in the first air cyclone 28 with larger and heavier particles exiting through the first air cyclone bottom port 30. The particles exiting the first air cyclone bottom port 30 may contain aluminum values, and therefore, this stream can be concentrated, such as by size separation 40, to form an aluminum concentrate and a waste product. The first air cyclone 28 also includes a first air cyclone top port 32 through which light particles are conducted. These particles are considered to be waste product and are disposed of. A further stream is conducted from the first air cyclone 28 to a second air cyclone 34 in which a further separation is conducted. Relatively larger and heavier particles exit the second air cyclone 34 through a second air cyclone bottom port 36, and can be concentrated, such as by size separation 40, to form an aluminum concentrate and a waste product. Light particles exit the second air cyclone 34 through a second air cyclone top port 38 and are disposed of.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method to recover metal from a dross material, comprising:

(a) comminuting said dross material in a comminution device;

(b) removing a salt enriched small size fraction from said comminuted dross material on a size separation basis;

(c) removing a metal enriched large size fraction from said comminuted dross material on a size separation basis;

(d) recovering metal from said metal enriched fraction by a method selected from the group consisting of eddy current separation, magnetic separation, electromagnetic separation, density separation, electrostatic separation, electrodynamic separation, size separation, shape separation and color separation to form a metal product and a recycle product; and (e) conducting said recycle product to said comminution device; and (f) wherein said method is conducted continuously.

2. The method of claim 1, wherein said comminution device is a mill.

3. The method of claim 2, wherein said mill is a semi-autogenous mill.

4. The method of claim 1, wherein said step of removing a salt enriched small size fraction comprises removing said salt enriched small size fraction using an air sweep.

5. The method of claim 1, wherein said dross material is selected from the group consisting of an aluminum dross, a copper slag, and a brass dross.

6. The method of claim 1, wherein said dross material comprises between about 5% and about 70% by weight metal.

7. The method of claim 1, wherein said metal is selected from the group consisting of aluminum, magnesium, nickel, tin, copper, brass, zinc, gold, silver and platinum.

8. The method of claim 1, wherein said recycle product comprises between about 30% and about 75% by weight metal.

9. The method of claim 1, wherein said step of recovering metal from said metal enriched fraction comprises eddy current separation.

10. The method of claim 1, wherein said recovered metal is aluminum.

11. The method of claim 1, wherein said dross material comprises between about 50% and about 65% by weight metal.

12. The method of claim 1, wherein said metal enriched fraction comprises greater than about 65% by weight metal.

13. The method of claim 1, wherein said recovered metal comprises greater than about 70% by weight metal.

14. The method of claim 1, wherein said salt enriched small size fraction is further processed by a vertical vortex classifier.

15. The method of claim 14, wherein a waste product from said vertical vortex classifier is further processed by cyclone classifiers.

16. The method of claim 1, wherein said dross has a particle size less than about 150 mm.

17. The method of claim 1, wherein said salt enriched small size fraction has an 80% passing particle size of less than about 2000 $\mu$m.

18. The method of claim 1, wherein said metal enriched large size fraction has an 80% retained particle size of greater than about 1.0 mm.

19. A method to recover metal from a dross material, comprising:

(a) comminuting said dross material in a semi-autogenous mill having a peripheral port;

(b) continuously removing a salt enriched fraction having an 80% passing particle size of about 2000 $\mu$m from said comminuted dross material using an air sweep;

(c) continuously removing a metal enriched fraction comprising greater than about 65% metal from said comminuted dross material through said peripheral port of said semi-autogenous mill;

(d) conducting eddy current separation on said metal enriched fraction to form an enriched product comprising greater than about 70% by weight metal and a recycle product; and (e) conducting said recycle product to said comminution mill.

20. The method of claim 19, wherein said dross material contains aluminum.

21. The method of claim 20, wherein said dross material contains between about 50% and about 65% by weight aluminum.

22. A method for recovering aluminum from an aluminum-containing dross, comprising:

(a) providing a continuous flow of said aluminum-containing dross having a particle size of less than about 150 mm and comprising between about 50% and about 65% by weight aluminum to a semi-autogenous mill having at least one peripheral port;

(b) reducing the size of said aluminum-containing dross in said semi-autogenous mill;

(c) directing a flow of air through said mill to remove a salt enriched fraction having an 80% passing particle size of about 2000 $\mu$m;

(d) removing an aluminum-enriched fraction having an 80% retained particle size of about 1.0 mm and comprising greater than about 65% by weight aluminum from said semi-autogenous mill through said at least one peripheral port;

(e) conducting eddy current separation on said aluminum-enriched fraction to form an enriched product comprising greater than about 70% by weight aluminum and a recycle product; and (f) returning said recycle product of said aluminum enriched fraction to said semi-autogenous mill.

* * * * *